US011270175B2

(12) United States Patent
Batra

(10) Patent No.: US 11,270,175 B2
(45) Date of Patent: Mar. 8, 2022

(54) RFID SYSTEM VEHICLE ACCESS CONTROL

(71) Applicant: Dominic M. Kotab, San Jose, CA (US)

(72) Inventor: Naresh Batra, Saratoga, CA (US)

(73) Assignee: Dominic M. Kotab, San Jose, CA (US)

( * ) Notice: Subject to any disclaimer, the term of this patent is extended or adjusted under 35 U.S.C. 154(b) by 0 days.

(21) Appl. No.: 17/028,884

(22) Filed: Sep. 22, 2020

(65) Prior Publication Data

US 2021/0012173 A1 Jan. 14, 2021

Related U.S. Application Data

(63) Continuation of application No. 15/687,210, filed on Aug. 25, 2017, now Pat. No. 10,817,766, which is a continuation of application No. 14/580,095, filed on Dec. 22, 2014, now Pat. No. 9,754,201, which is a continuation of application No. 11/423,408, filed on Jun. 9, 2006, now Pat. No. 8,917,178.

(51) Int. Cl.
*G06K 19/07* (2006.01)
*G08B 13/24* (2006.01)
*G01M 5/00* (2006.01)
*G06K 19/077* (2006.01)

(52) U.S. Cl.
CPC .......... *G06K 19/0704* (2013.01); *G01M 5/00* (2013.01); *G06K 19/07707* (2013.01); *G06K 19/07758* (2013.01); *G08B 13/2462* (2013.01)

(58) Field of Classification Search
CPC ............................................. G06K 19/0704
USPC ........................................................ 235/492
See application file for complete search history.

(56) References Cited

U.S. PATENT DOCUMENTS

| 6,898,489 | B1 | 5/2005 | Hayes, Sr. | |
| 10,872,282 | B2 | 12/2020 | Batra | |
| 11,182,660 | B2 | 11/2021 | Batra | |
| 2004/0232229 | A1* | 11/2004 | Gotfried | B60R 25/252 235/382 |
| 2007/0247333 | A1* | 10/2007 | Borean | G07C 1/30 340/932.2 |

OTHER PUBLICATIONS

Notice of Allowance from U.S. Appl. No. 15/687,140, dated Aug. 18, 2020.
Non-Final Office Action from U.S. Appl. No. 15/687,180, dated Feb. 19, 2021.
Supplemental Notice of Allowance from U.S. Appl. No. 15/687,140, dated Nov. 16, 2020.
Patent Board Decision on Appeal from U.S. Appl. No. 15/687,180, dated Dec. 16, 2020.
Notice of Allowance from U.S. Appl. No. 15/687,180, dated Jul. 19, 2021.
Supplemental Notice of Allowance from U.S. Appl. No. 15/687,180, dated Oct. 15, 2021.

* cited by examiner

*Primary Examiner* — Toan C Ly
(74) *Attorney, Agent, or Firm* — Zilka-Kotab, P.C.

(57) ABSTRACT

A Radio Frequency Identification (RFID) tag according to one embodiment includes a housing configured for coupling to a vehicle; control circuitry coupled to the housing and operatively coupled to an electrical system of the vehicle; and a memory for storing information; where the control circuitry directly controls access to the vehicle via the operative coupling to the electrical system of the vehicle.

14 Claims, 7 Drawing Sheets

RFID SYSTEM VEHICLE ACCESS CONTROL

RELATED APPLICATIONS

This patent application is a continuation of U.S. patent application Ser. No. 15/687,210, filed Aug. 25, 2017, which claims priority from and is related to U.S. patent application Ser. No. 14/580,095, filed Dec. 22, 2014, which claims priority from and is related to U.S. patent application Ser. No. 11/423,408, filed on Jun. 9, 2006, which are herein incorporated by reference.

FIELD OF THE INVENTION

The present invention relates to Radio Frequency Identification (RFID) systems and methods, and more particularly, this invention relates to systems and methods for tracking and singulating tagged objects.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the Universal Product Code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it impossible to count objects or individually check expiration dates, much less find one particular carton of many.

Currently, retail items are marked with barcode labels. These printed labels have over 40 "standard" layouts, can be mis-printed, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. However, Radio Frequency Identification (RFID) allows the physical layer of actual goods to automatically be tied into software applications, to provide accurate tracking.

The emerging RFID technology employs a Radio Frequency (RF) wireless link and ultra-small embedded computer chips, to overcome these barcode limitations. RFID technology allows physical objects to be identified and tracked via these wireless "tags". It functions like a bar code that communicates to the reader automatically without needing manual line-of-sight scanning or singulation of the objects.

Addition of battery power to RFID tags has greatly increased the range in which reliable communication with the tag is possible. This has in turn made new applications possible. One such application is use of RFID tags in an automatic toll payment system. In such a system, an RFID tag having a unique ID that is associated with a vehicle is mounted to the vehicle windshield. When the vehicle passes through a toll lane, the tag identifier is read, correlated with an account, and payment is debited from the account. Thus, the need for a human toll collector is eliminated, as is the need to stop the vehicle at a toll booth. Further, such automated toll lanes are often dedicated to those vehicles having the RFID tag, thereby minimizing toll-collection-related delays.

One drawback of such systems is that the battery does not have an infinite life. Rather, once the battery is dead, the tag must typically be discarded. One solution is to connect the tag to the electrical system of the automobile. However, not only does the automobile need to be retrofitted to provide the power line to the tag, but the tag is then permanently mounted to the vehicle, meaning that if the owner decides to drive another car on the toll road or bridge, the driver must wait in line to pay at a toll booth rather than pass through the automated toll lane.

Another prominent use of battery powered RFID tags is asset tracking during shipment through a supply chain. However, as mentioned above, the life of the battery is not infinite, and so the tag will likely not remain active for the entire life of the object to which coupled. The tag may still respond to queries in a passive mode, where the tag is powered by the incoming RF signal, but the range for such communication is severely limited and may not be suitable for applications involving fast moving items such as automobiles, or in situations where an RFID interrogator is not readily available within range of the tag.

What are therefore needed are RFID systems and methods for uses such as asset tracking, ownership transfer tracking and toll collection, which have a greatly improved life span and which overcome the deficiencies in heretofore known systems.

SUMMARY OF THE INVENTION

A Radio Frequency Identification (RFID) tag according to one embodiment includes a housing configured for coupling to a vehicle; control circuitry coupled to the housing and operatively coupled to an electrical system of the vehicle; and a memory for storing information; where the control circuitry directly controls access to the vehicle via the operative coupling to the electrical system of the vehicle.

A method according to another embodiment includes receiving a query at a Radio Frequency Identification (RFID) tag operatively coupled to an electrical system of a vehicle; and directly controlling, by control circuitry of the RFID tag, access to the vehicle via the operative coupling to the electrical system of the vehicle; wherein the RFID tag includes a memory for storing information.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag.

Figure 1:
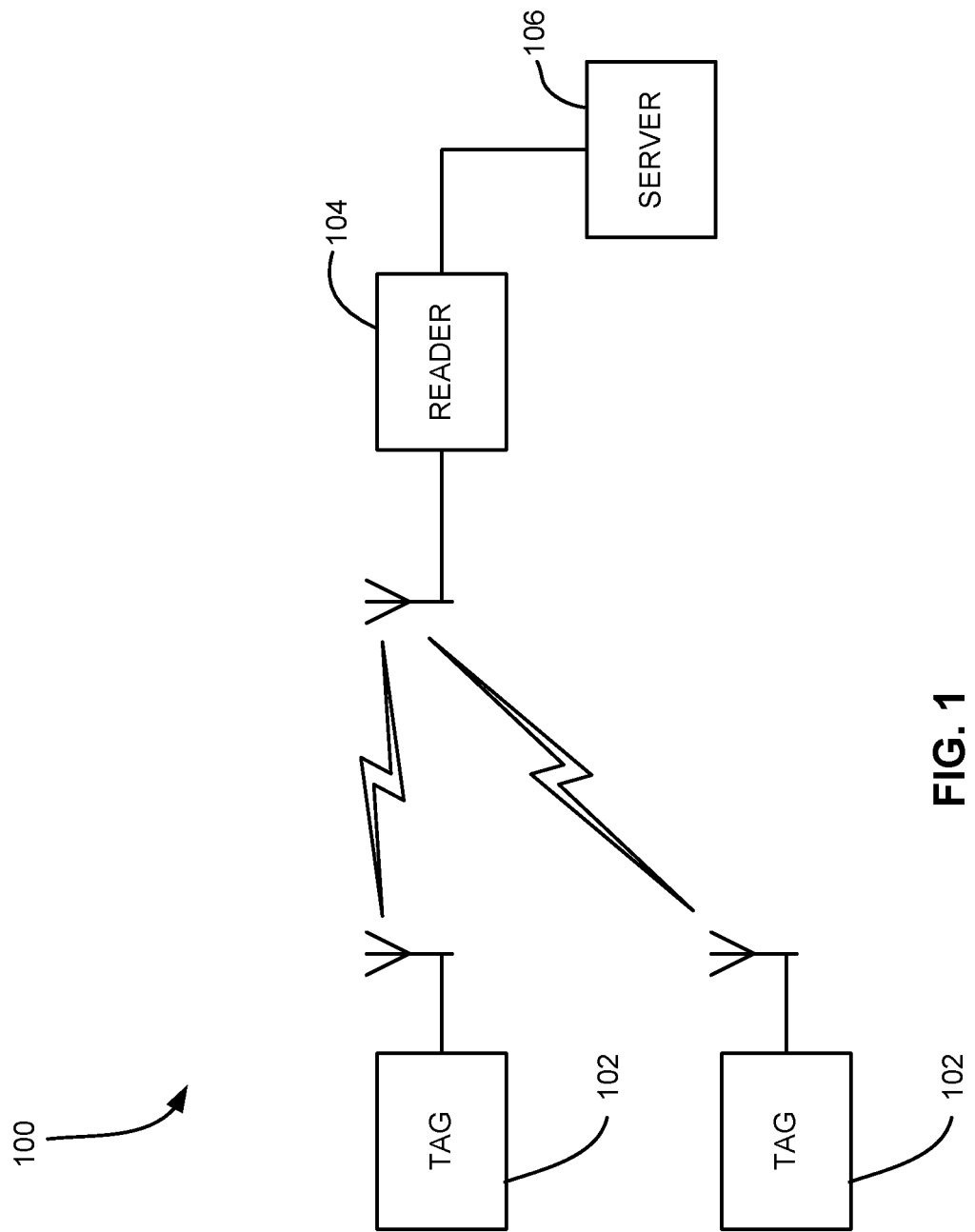
FIG. 1 is a system diagram of an RFID system.

As shown in FIG. 1, an RFID system 100 typically includes RFID tags 102, an interrogator or "reader" 104, and an optional server 106 or other backend system which may include databases containing information relating to RFID tags and/or tagged items. Each tag 102 may be coupled to an object. Each tag 102 includes a chip and an antenna. The chip includes a digital decoder needed to execute the computer commands that the tag 102 receives from the interrogator 104. The chip may also include a power supply circuit to extract and regulate power from the RF interrogator; a detector to decode signals from the interrogator; a backscatter modulator, a transmitter to send data back to the interrogator; anti-collision protocol circuits; and at least enough memory to store its unique identification code, e.g., Electronic Product Code (EPC).

The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

Communication begins with an interrogator 104 sending out signals via radio wave to find a tag 102. When the radio wave hits the tag 102 and the tag 102 recognizes and responds to the interrogator's signal, the interrogator 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the interrogator 104. Since passive (Class-1 and Class-2) tags get all of their power from the interrogator signal, the tags are only powered when in the beam of the interrogator 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost Class-3

Semi-passive tags (also called semi-active tags)

Battery tags (256 bits to 2M words)

Self-Powered Backscatter (internal clock, sensor interface support)

~100 meter range

Moderate cost

Class-4

Active tags

Active transmission (permits tag-speaks-first operating modes)

~30,000 meter range

Higher cost

In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the interrogator to respond. Class-3 tags only need a 5 mV signal from the interrogator in comparison to the 500 mV that Class-1 and Class-2 tags typically need to operate. This 100:1 reduction in power requirement along with the reader's ability to sense a very small backscattered signal enables the tag permits Class-3 tags to operate out to a free space distance of 100 meters or more compared with a Class-1 range of only about 3 meters. Note that semi-passive and active tags may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. High-frequency (860 MHz to 960 MHz and 2.4 GHz to 2.5 GHz) tags offer increased read ranges and high reading speeds. One illustrative application of high frequency tags is automated toll collection on highways and interstates.

Figure 2:
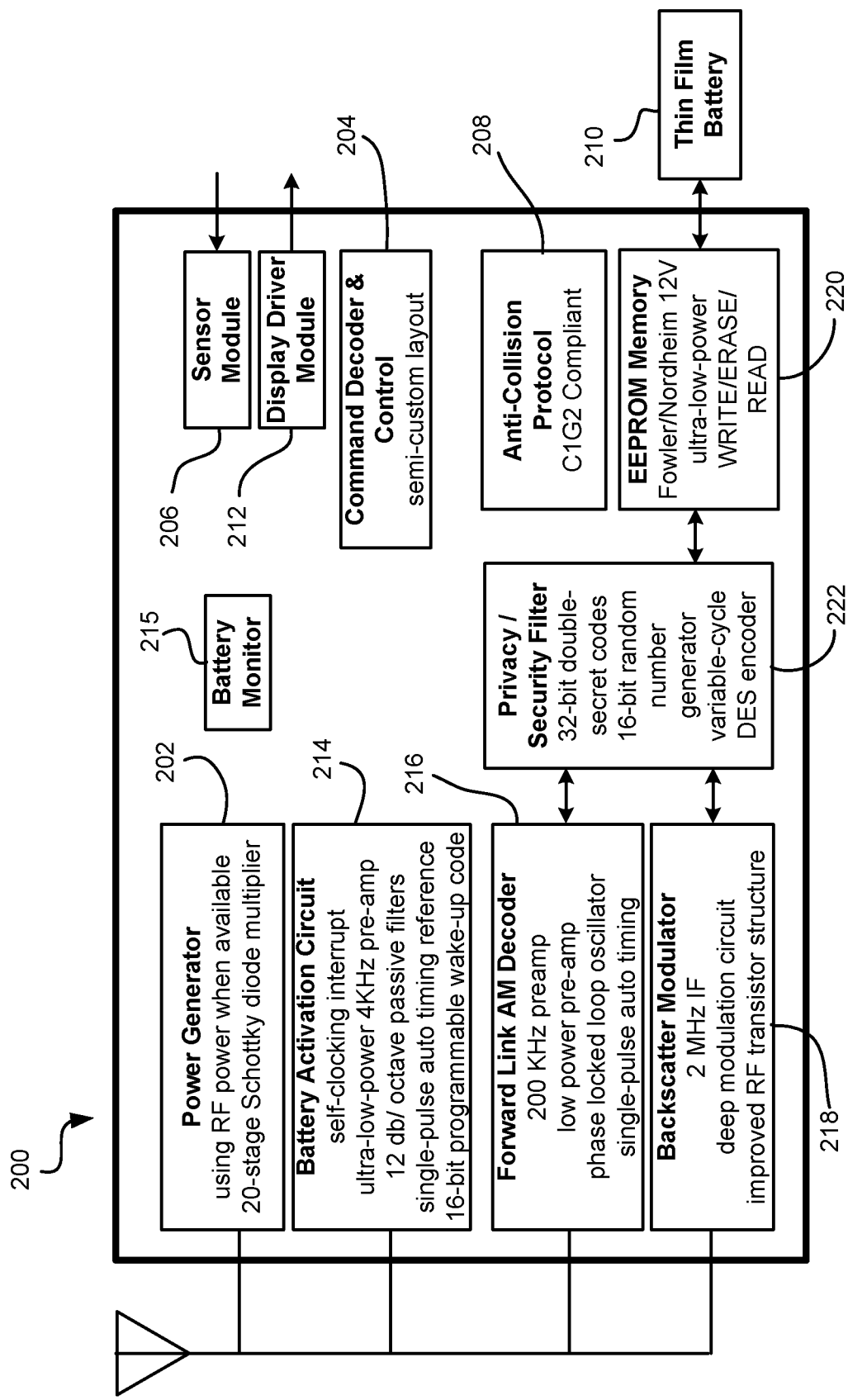
FIG. 2 is a system diagram for an integrated circuit (IC) chip for implementation in an RFID tag.

Embodiments of the present invention are preferably implemented in a Class-3 or higher Class chip (processor). FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A battery activation circuit 214 is also present to act as a wake-up trigger. In brief, many portions of the chip 200 remain in hibernate state during periods of inactivity. A hibernate state may mean a low power state, or a no power state. The battery activation circuit 214 remains active and processes incoming signals to determine whether any of the signals contain an activate command. If one signal does contain a valid activate command, additional portions of the chip 200 are wakened from the hibernate state, and communication with the interrogator can commence. In one embodiment, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210. While any type of battery activation circuit known in the art can be potentially integrated into the system, an illustrative battery activation circuit 214 is described in copending U.S. patent application Ser. No. 11/007,973 filed Dec. 8, 2004 with title "BATTERY ACTIVATION CIRCUIT", which is herein incorporated by reference.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements.

The module 200 may also incorporate a highly-simplified, yet very effective, security encryption circuit 222. Other security schemes, secret handshakes with interrogators, etc. can be used.

Only four connection pads (not shown) are required for the chip 200 to function: Vdd to the battery, ground, plus two antenna leads to support multi-element omni-directional and isotropic antennas. Sensors to monitor temperature, shock, tampering, etc. can be added by appending an industry-standard I²C or SPI interface to the core chip.

It should be kept in mind that the present invention can be implemented using any type of tag, and the circuit 200 described above is presented as only one possible implementation.

Many types of devices can take advantage of the embodiments disclosed herein, including but not limited to RFID systems and other wireless devices/systems. To provide a context, and to aid in understanding the embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. In other words, the invention can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

A computer for storing and/or executing the code and/or performing the processes described herein can be any type of computing device, including a personal computer (PC), laptop PC, handheld device (e.g., personal digital assistant (PDA)), portable telephone, etc.

Figure 3:
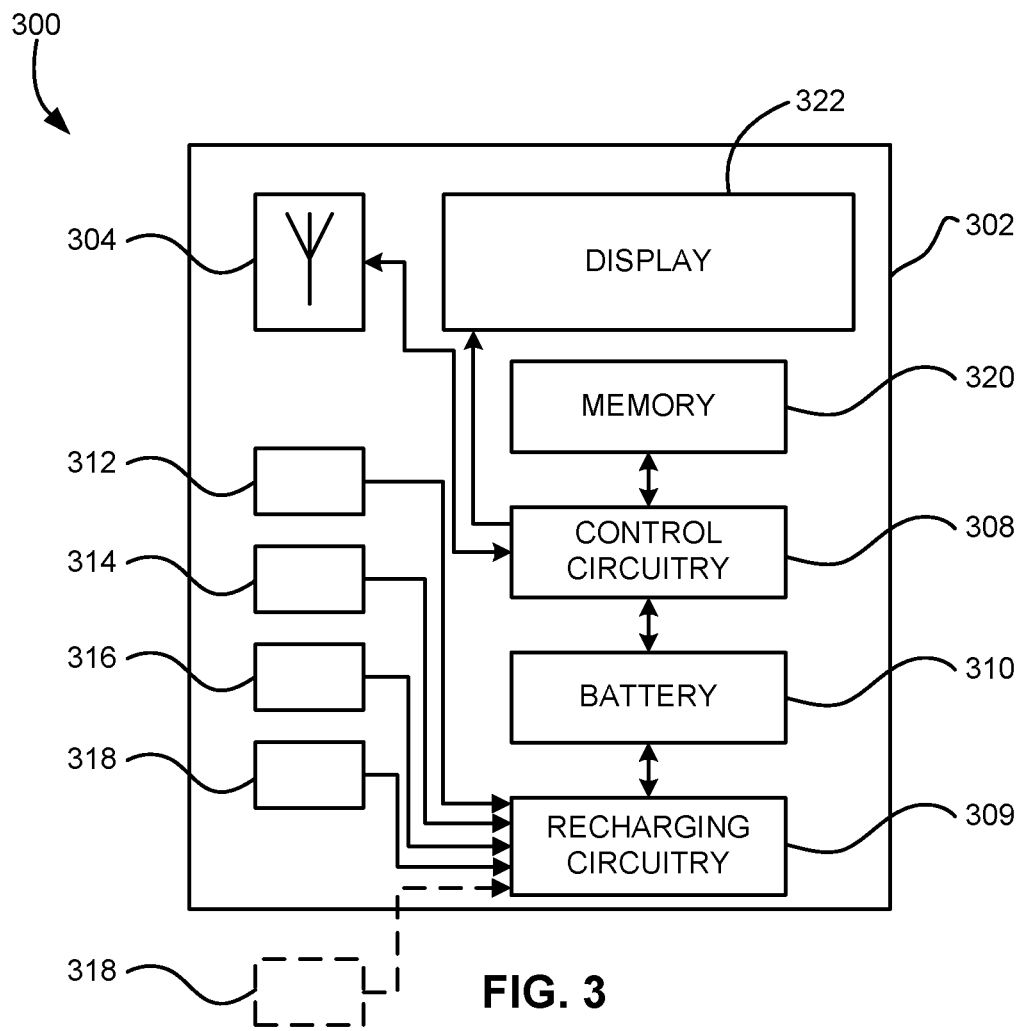
FIG. 3 is a system diagram of an RFID tag for use with a vehicle according to one embodiment of the present invention.
Figure 4:
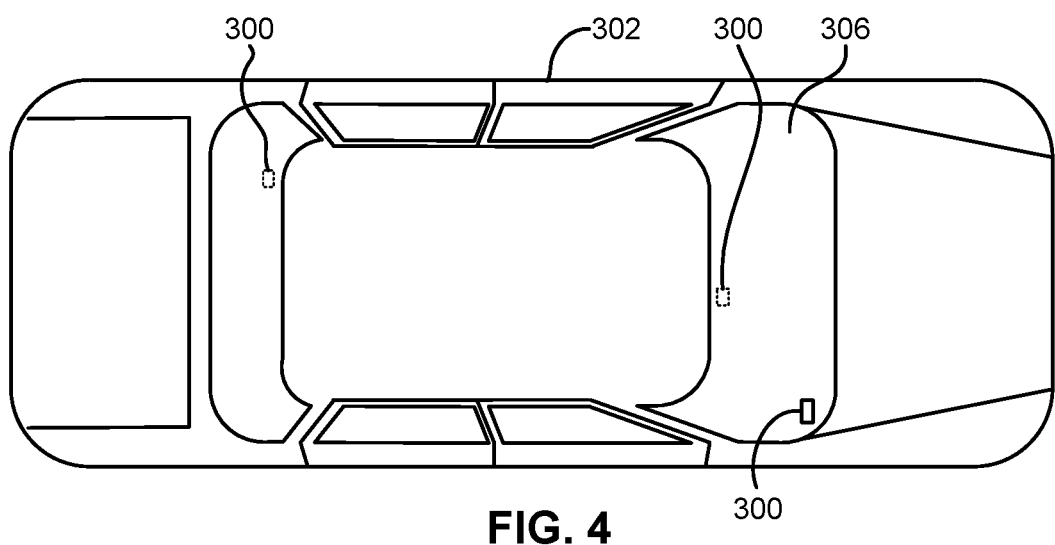
FIG. 4 illustrates the tag of FIG. 3 in use with a vehicle.

FIG. 3 illustrates a Radio Frequency Identification (RFID) tag 300 for use with a vehicle according to one embodiment of the present invention. FIG. 4 illustrates multiple tags 300 in use with a vehicle 302. The tag 300 includes a housing 302 configured for permanent or detachable coupling to the vehicle 302. Permanent coupling to the vehicle 302 can be achieved via adhesives, threaded fasteners, rivets, etc. The housing may be configured for permanent or detachable coupling to a window of the vehicle, such as the windshield 306 (as shown) or back window. Coupling to other locations on the vehicle such as on the exterior surface thereof, on the dashboard, etc. is also possible. The tag 300 may also be integrated into the vehicle 302, e.g., integrated by injection molding into a portion of the vehicle such as the dashboard, rear view mirror, or other area that is capable of receiving RF transmissions relatively unimpeded.

Preferably, the tag is permanently coupled to the vehicle by a manufacturer of the vehicle, thereby allowing tracking of the vehicle throughout its life. However, the tag may be affixed later. For example, the tag may be coupled to the vehicle by a dealer of the vehicle, a repair shop, etc.

With continued reference to FIG. 3, the tag 300 includes one or more antennae 304, control circuitry 308 coupled to the housing, recharging circuitry 309, and a battery 310 for providing power to the control circuitry 308. The control circuitry 308 may be embodied in a chip, as shown in FIG. 2.

One or more secondary power sources 312-318 are also present for recharging the battery and/or powering the controller. The secondary power source(s) may be any type of secondary power source. Preferred secondary power sources generate electricity from light (e.g., solar power), thermal energy, and/or kinetic energy. As shown in FIG. 3, illustrative secondary power sources include a seismic transducer 312, piezoelectric transducer 314, acoustic transducer 316 and photovoltaic cells 318, each of which may also contain passive and/or low-power active circuits such as transformers, resistors and capacitors to condition the transducer outputs to match the input requirements of the recharging circuitry.

As FIG. 3 shows, seismic transducer 312, piezoelectric transducer 314, acoustic transducer 316 and/or photovoltaic cells 318 are used to either receive energy from a generating source or transmit energy and couples that energy to recharging circuitry 309. All of the transducers, (312, 314 and 316) are capable of generating and transmitting their own energy which will prove advantageous to the present invention. Any one of the above mentioned devices or any combination thereof may be used to present energy in the form of an alternating current (A.C.) or direct current (D.C.) voltage to recharging circuitry 309. Recharging circuitry 309 then processes the energy received and provides it to the battery (or batteries, but referred to hereinafter as battery for example purposes) 310 as a trickle charging source. The capability of recharging the battery greatly extends the active (self-powered) life of the tag.

Figure 5:
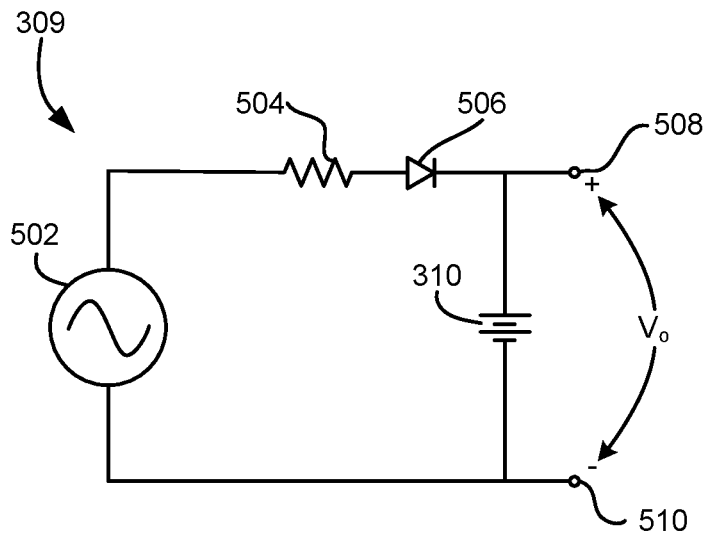
FIG. 5 is a circuit diagram of recharging circuitry.

FIG. 5 depicts suitable recharging circuitry 309 that may be used for receiving an A.C. voltage source 502 (again, from at least one of the secondary power sources 304, 312, 314, 316 and 318) wherein the A.C. current developed is limited by current limiting resistor 504, rectified by diode 506 and developed across terminals 508 and 510 of the battery 310 for trickle charging.

In one embodiment, the control circuitry 308 draws power from a secondary power source when the secondary power source is generating electricity. This also helps conserve battery power, as well as allows the tag to operate when the battery is diminished. The control circuitry may remain in an active state when drawing power from the secondary power source, as opposed to reverting to a battery-conserving hibernate state.

Referring back to FIG. 3, each voltage source receiver must receive its power from a power generating source or generate its own. Referring now to seismic transducer 312, a seismic geophone (such as a magnet-on-spring bouncing inside a coil) may be used to create a power source that is received by seismic transducer 312. Transducer 312 then in turn generates a voltage that is presented to recharging circuitry 309 and the process continues as described above. The seismic geophone used could also be a separate unit located in close proximity to the RFID tag 300.

Referring now to piezoelectric transducer 314, energy is received from a source such as a seismic piezoelectric accelerometer. Transducer 314 then in turn generates a voltage that is presented to recharging circuitry 309 and the process continues as described above. The seismic piezoelectric accelerometer may be directly attached to the RFID tag 300 or in a separate unit located in communicable proximity to the RFID tag 300.

Referring now to acoustic transducer 316, acoustic energy (e.g., ultrasonic waves) is received by transducer 316. Though an acoustic transducer is preferred for receiving acoustic energy, and is an electromagnetic form of an ultrasonic transducer, other ultrasonic transducers that may be used include piezoelectric, electrostatic, and magnetostrictive devices. In fact, any of these ultrasonic transducers may be used to generate an ultrasonic wave that would be detected by transducer 316. Transducer 316 then in turn generates a voltage that is presented to recharging circuitry 309 and the process continues as described above.

Referring now to photovoltaic cells 318, these cells are preferably mounted on the exterior of the RFID tag 300 (as indicated by the dashed lined box 318), or they could be infrared cells fabricated on the inside of the RFID tag 300 that are driven by heat dissipated by the package. An infrared source for heating the package would then be required. Cells 318 then in turn generate a voltage that is presented to recharging circuitry 309 and the process continues as described above.

Memory 320 on the tag 300 stores information relating to the vehicle 302 and/or an owner of the vehicle. For example, the memory 320 can store information such as a vehicle identification number (VIN), a license plate number associated with the vehicle, a name of the owner of the vehicle, a government-issued registration number associated with the vehicle, etc.

The memory 320 may also store information relating to an insurance policy associated with the vehicle. Such information may include the policy number, whether the policy is in force, expiration date of the policy, persons covered by the policy, etc.

The memory 320 may also store information relating to a service history of the vehicle. Such information can include a service record identification number, dates and types of service, locations of service, identification of the technician who performed the service, any problems encountered, etc.

The memory may also store information relating to a toll payment account associated with the vehicle and/or owner. Thus, embodiments of the tag may act as a toll pass with account information, payment information, etc.

Preferably, a security protocol is in place so that unauthorized interrogators cannot access the information stored on the tag. The security protocol may include a password-based secret handshake, for example. Accordingly, access to portions of the information stored in the memory may be selectively allowed or denied based on information received from the inquiring entity. Such information can include a security code, identification of the entity or type of entity, password for a secret handshake, etc. Further, the transmission is preferably encrypted using any suitable encryption scheme.

The tag 300 may further include a display device 322 for displaying at least a portion of the information relating to the vehicle and/or owner. For instance, the tag may display the VIN upon receiving a query from a police interrogator. In another example, the tag may display an amount of prepaid money remaining in the driver's toll account, an amount of tolls accumulated since the last payment, etc.

In some embodiments of the present invention, the rechargeable battery can be replaced. This is useful, for instance, where the battery will no longer maintain an acceptable charge.

The information stored in the tag can be transferred into a new tag if the tag falters or fails for some reason. The information (or portion thereof) can be loaded by the then-owner, a dealer, a govt. entity, etc.

Similarly, information, such as registration and insurance information, can be uploaded to the tag via roadside readers, etc. A roadside reader can be attached to anything, including a road sign, bridge, overpass, etc. For example, as cars pass by an overhead reader, the reader queries the tag for its registration information. The reader compares the registration information to data stored in a local or remote database. If the registration information is expired, the reader can update the tag if the owner has renewed, or can register the violation with law enforcement. If the registration information shows signs of tampering, e.g., the tag indicates that the registration is current but the database indicates that it is expired, the system can send a notice to law enforcement. Because the tag is a long range tag, it can be read reliably even at highway speeds, e.g., 60 miles per hour.

In another example of use, during a routine traffic stop by police, a reader in the police car can scan the tag in the automobile and, using the retrieved information, perform a variety of functions. For example, information stored on the tag can be output to the officer. Such information can include registration and insurance information, registered owner, license plate number, etc. Further, the system may automatically query a database to retrieve additional information about the vehicle and/or its owner. For example, the VIN retrieved from the tag can be automatically compared to a list of VIN's associated with stolen vehicles or vehicles believed to be involved in a crime. Similarly, the name of the registered owner can compared to a list of persons having outstanding warrants. If the vehicle is listed as stolen or possible involved in a crime, or the registered owner has a warrant outstanding, the office can be warned and thus allowed to take precautions.

As alluded above, access to certain information can be selective based on the inquiring entity. For instance, only police may have access to the vehicles registration information stored on the tag. Only a toll interrogator may have access to the user's payment information stored on the tag. A repair shop may not have access to the registration information or toll payment information. But the police, toll and repair shop interrogators may all be granted access to the VIN for tracking purposes, for example.

The tag may also provide security functions. For example, the tag may be operatively coupled to the electrical system of the vehicle via hardwired or wireless connection. Removal of the tag causes disablement of the vehicle, e.g., the engine will not start. Likewise, a valid user tag (e.g., tag associated with an authorized user such as registered owner) may need to be present in order to start the vehicle. Illustrative RFID-based security systems and methods suitable for integration into embodiments of the present invention are found in U.S. patent application entitled "RFID-BASED SECURITY SYSTEMS AND METHODS" filed concurrently herewith to the same inventor and which is herein incorporated by reference.

Figure 6:
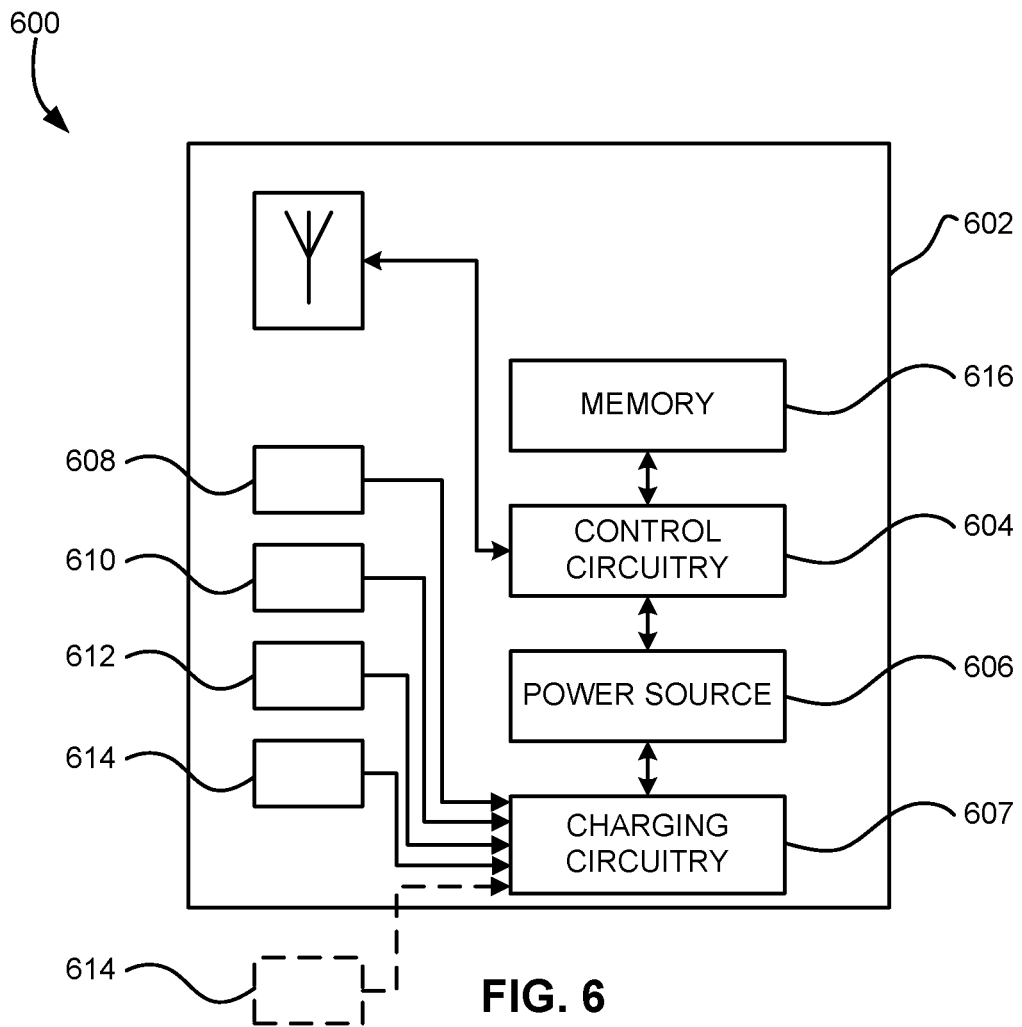
FIG. 6 is a system diagram of an RFID tag for use with a vehicle according to one embodiment of the present invention.

FIG. 6 illustrates an RFID tag 600 for use with a vehicle according to another embodiment. In this embodiment, the tag 600 includes a housing 602 configured for use with a vehicle, control circuitry 604 coupled to the housing, a reusable, rechargeable, non-battery power source 606 for providing power to the control circuitry, one or more secondary power sources 608-614 for recharging the non-battery power source 606, charging circuitry and a memory 616 for storing information relating to the vehicle and/or the owner of the vehicle. As shown in FIG. 6, illustrative secondary power sources include a seismic transducer 608, piezoelectric transducer 610, acoustic transducer 612 and photovoltaic cells 614. The non-battery power source 606 can be a high time constant capacitor held in a charged state by the secondary power source(s) until needed.

Figure 7:
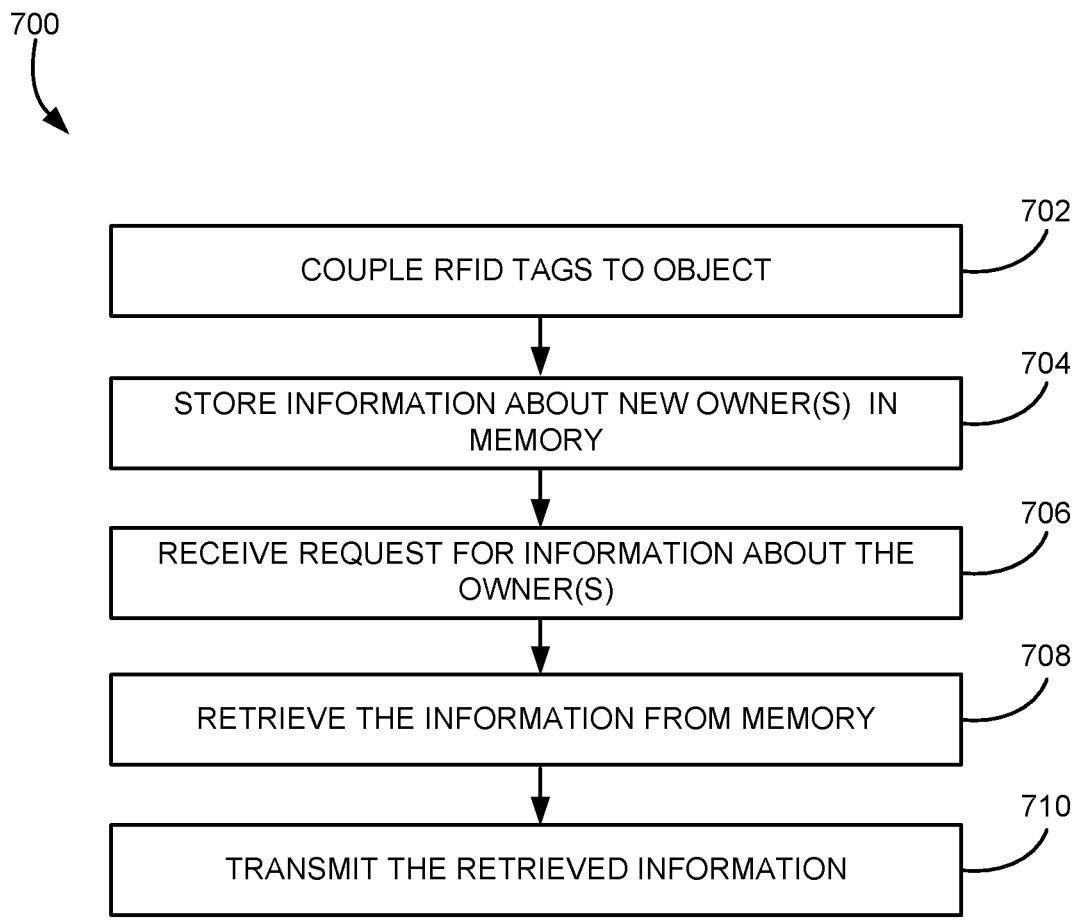
FIG. 7 is a process diagram of a method for tracking ownership of a moveable object according to one embodiment of the present invention.

FIG. 7 depicts a method 700 for tracking ownership of a moveable object according to one embodiment of the present invention. The method can be used with any type of asset or chattel that moves through a chain of commerce including vehicles, transportation containers, animals, e.g., cattle (ear tags, implants), train cars, golf carts, etc. that are tracked and subject to ownership transfer. In operation 702, RFID tags are coupled to the objects. Each tag has a battery for providing power to control circuitry, a secondary power source for recharging the battery, and a memory for storing information relating to previous and current owners of the object. In operation 704, information about a new owner is added to the memory upon transferring ownership of the object to the new owner. In operations 706-710, the information about the owners is retrieved from memory and transmitted upon receiving a request for the information.

The tag may be coupled to the object at about a point of manufacture of the object. For example, the tag may be placed on a vehicle windshield during or shortly after manufacturing. The tag can then be used to track the automobile in the manufacturer's lot. When the vehicle is sent from the manufacturer to the consumer, the tag stores the ownership transfer to the delivery truck, stores the ownership transfer from the truck to the dealer, allows tracking the automobile in the dealer lot, and stores the ownership transfer from the dealer to the consumer.

Figure 8:
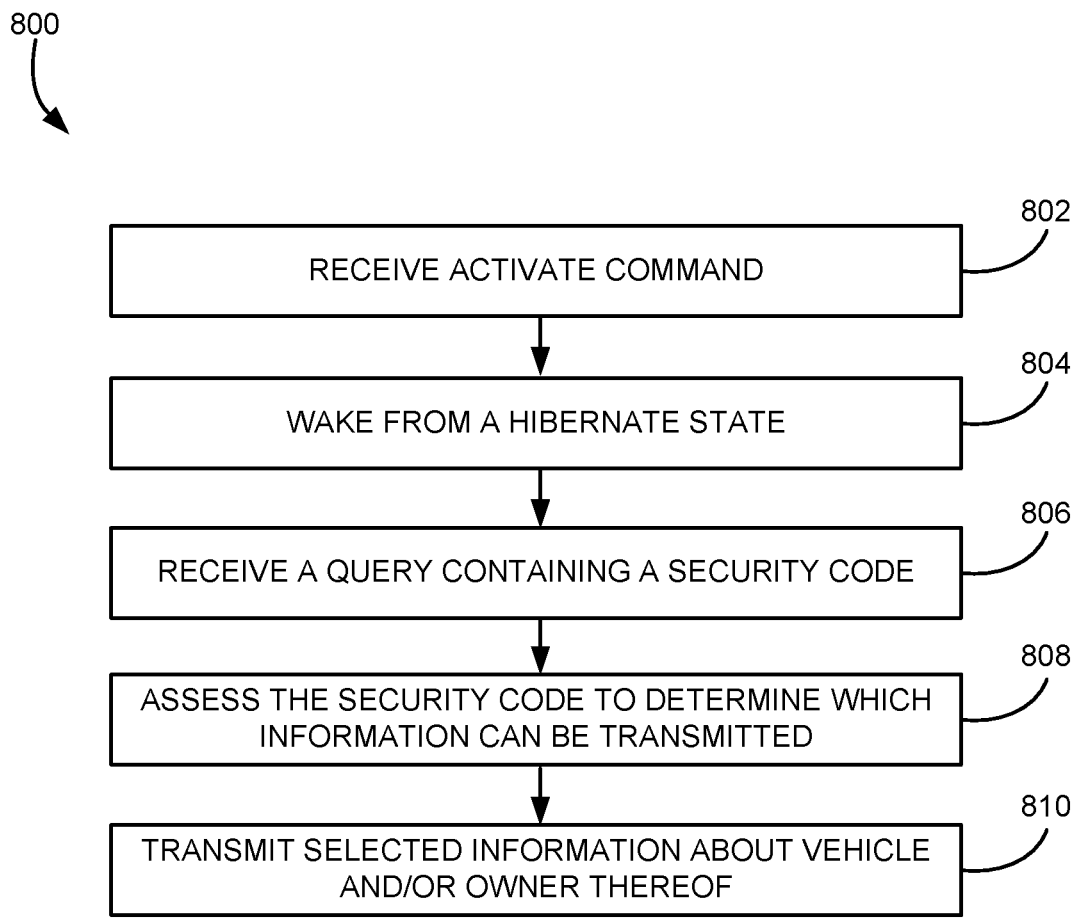
FIG. 8 is a process diagram of a method for transmitting information about a vehicle according to one embodiment of the present invention.

FIG. 8 depicts a method 800 for transmitting information about a vehicle according to one embodiment of the present invention. In operation 802, an activate command is received at an RFID tag coupled to the vehicle. In operation 804, the tag wakes from a hibernate state. In operation 806, a query is received, the query containing a security code. In operation 808, the security code is assessed to determine which information can be transmitted. In response to the query and based on the assessment, information relating to the vehicle or the owner is transmitted in operation 810. The particular information transmitted depends on the security code received.

Figure 9:
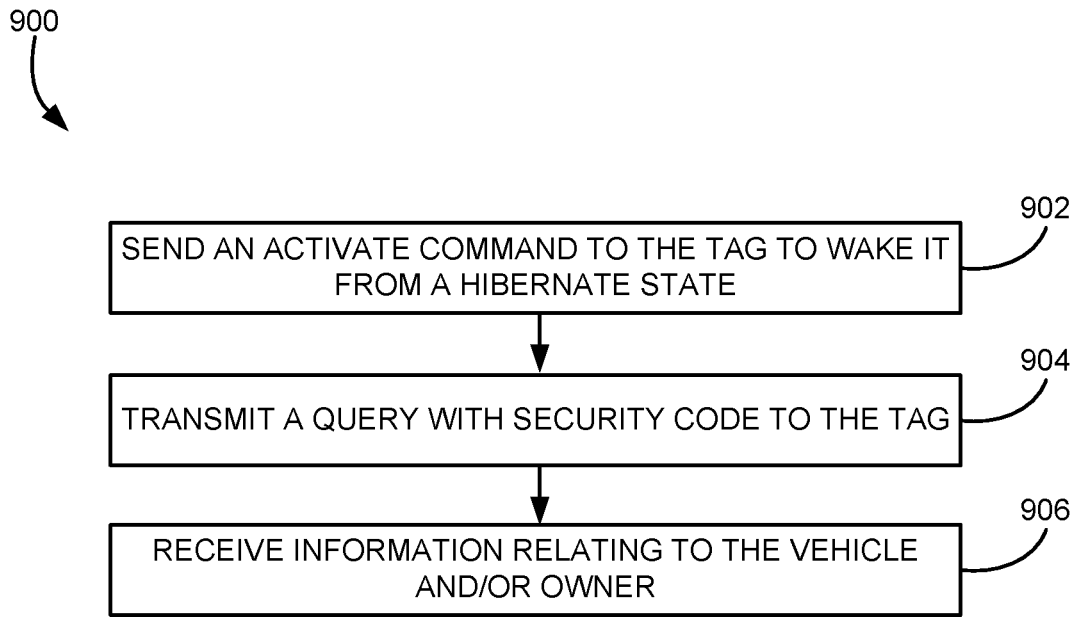
FIG. 9 is a process diagram of a method for retrieving information about a vehicle according to one embodiment of the present invention.

FIG. 9 depicts a method 900 for retrieving information about a vehicle according to one embodiment of the present invention. In operation 902, an activate command is sent to the tag to wake it from a hibernate state. In operation 904, a query is transmitted to an RFID tag coupled to the vehicle, the query containing a security code, e.g., password, pseudo-random number, etc. In operation 906, information relating to the vehicle and/or the owner is received. The particular information received or decodable depends on the security code sent to the tag.

Figure 10:
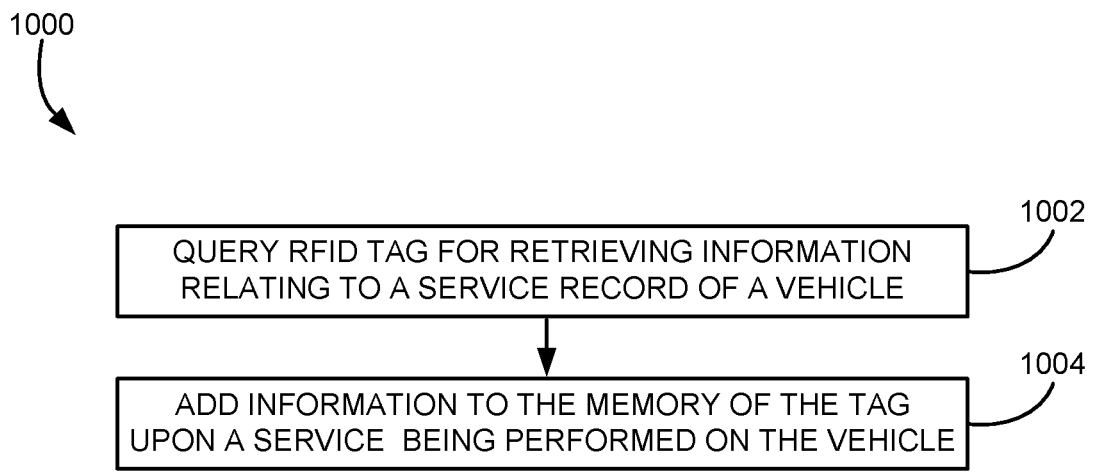
FIG. 10 is a process diagram of a method for storing information relating to a service record of a vehicle using an RFID tag coupled to a vehicle according to one embodiment of the present invention.

FIG. 10 depicts a method 1000 for storing information relating to a service record of a vehicle using an RFID tag coupled to a vehicle. In operation 1002, the RFID tag is queried for retrieving information relating to a service record of the vehicle. In operation 1004, information is added to the memory of the RFID tag upon a service being performed on the vehicle.

In a repair shop example, the moment a car pulls into the shop, the reader scans the tag and identifies the vehicle. The identification is used to extract data about the vehicle from a database. Such information may include vehicle and owner information, service history, payment history, etc.

The tag may also be tied to the onboard computer system of the automobile to enable such features as transmitting information about problems with the vehicle directly to the interrogator without requiring a hardwired connection.

One skilled in the art will appreciate how the systems and methods presented herein can be applied to a plethora of scenarios and venues, including but not limited to automotive yards, warehouses, construction yards, retail stores, boxcars and trailers, etc. Accordingly, it should be understood that the systems and methods disclosed herein may be used with objects of any type and quantity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) system, comprising:
control circuitry operatively coupled to an electrical system of a vehicle; and
a memory for storing information;
where the control circuitry receives a query and directly controls access to the vehicle via the operative coupling to the electrical system of the vehicle.

2. The RFID system as recited in claim 1, wherein the control circuitry is configured to receive the query originating from a portable telephone, and transmit at least an identification number, in response to the query.

3. The RFID system as recited in claim 2, wherein the receiving is encrypted.

4. The RFID system as recited in claim 1, wherein the information includes an identification number.

5. The RFID system as recited in claim 1, wherein access to portions of the information stored in the memory is selectively allowed or denied based on information received from an inquiring entity.

6. The RFID system as recited in claim 1, further comprising:
a first power source for providing power to the control circuitry; and
a secondary power source physically coupled to the first power source for recharging the first power source.

7. The RFID system as recited in claim 6, wherein the first power source includes a battery for providing power to the control circuitry.

8. A method, comprising:
receiving a query at a Radio Frequency Identification (RFID) system operatively coupled to an electrical system of a vehicle; and
directly controlling, by control circuitry of the RFID system, access to the vehicle via the operative coupling to the electrical system of the vehicle;
wherein the RFID system includes a memory for storing information.

9. The method as recited in claim 8, wherein the query originates from a portable telephone.

10. The method as recited in claim 9, wherein the receiving is encrypted.

11. The method as recited in claim 8, wherein the information includes an identification number.

12. The method as recited in claim 8, wherein access to portions of the information stored in the memory is selectively allowed or denied based on information received from an inquiring entity.

13. The method as recited in claim 8, further comprising:
a first power source for providing power to the control circuitry; and
a secondary power source physically coupled to the first power source for recharging the first power source.

14. The method as recited in claim 13, wherein the first power source includes a battery for providing power to the control circuitry.

* * * * *